W. E. ANDREWS.
ELECTRIC WELDING MACHINE.
APPLICATION FILED JULY 6, 1914.

1,115,461.

Patented Oct. 27, 1914.

3 SHEETS—SHEET 1.

WITNESSES:
F. E. Arthur
W. F. Keefer

INVENTOR
W. E. Andrews
BY
W. E. Dunlap
ATTORNEY

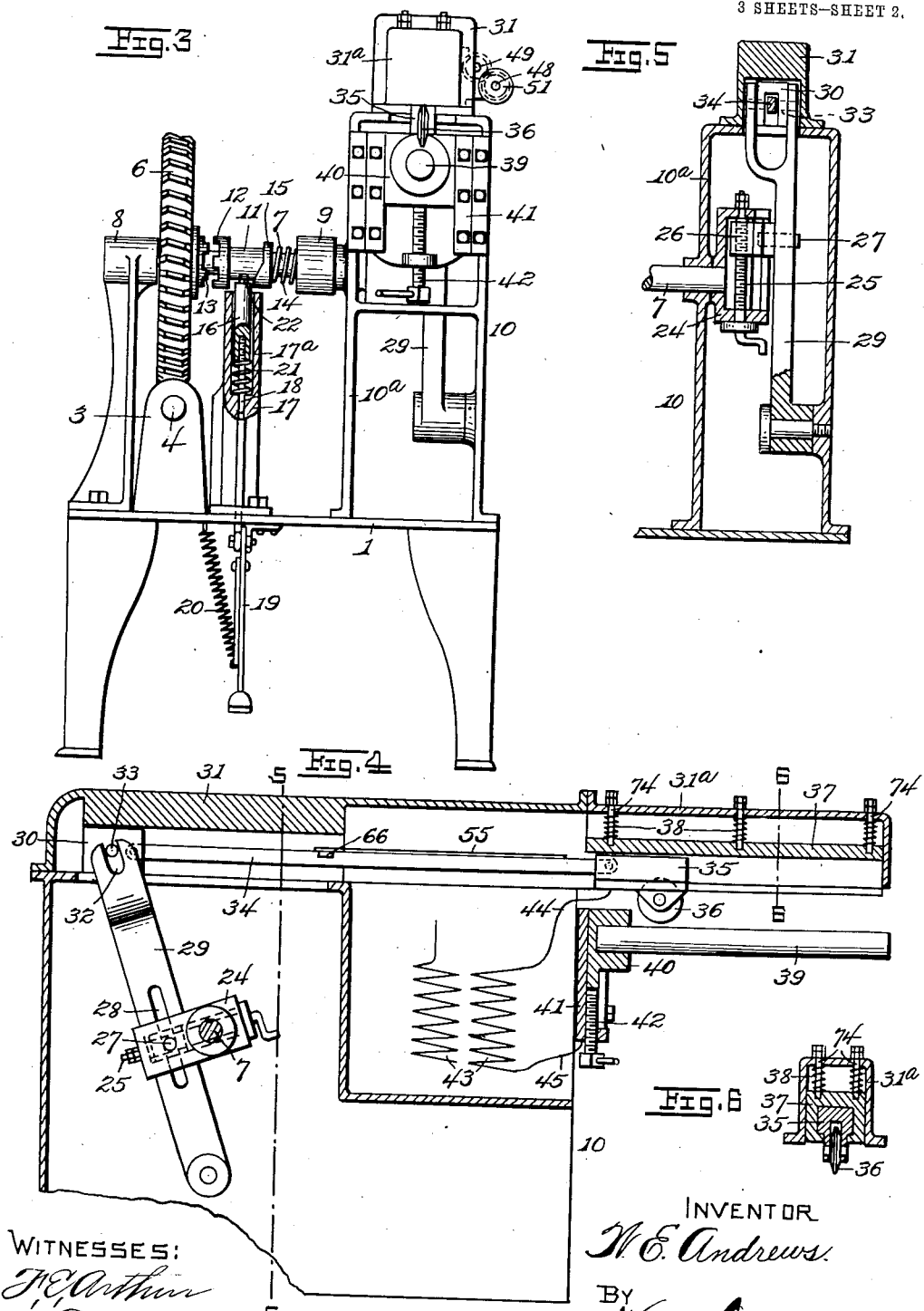

W. E. ANDREWS.
ELECTRIC WELDING MACHINE.
APPLICATION FILED JULY 6, 1914.
1,115,461.
Patented Oct. 27, 1914.
3 SHEETS—SHEET 3.
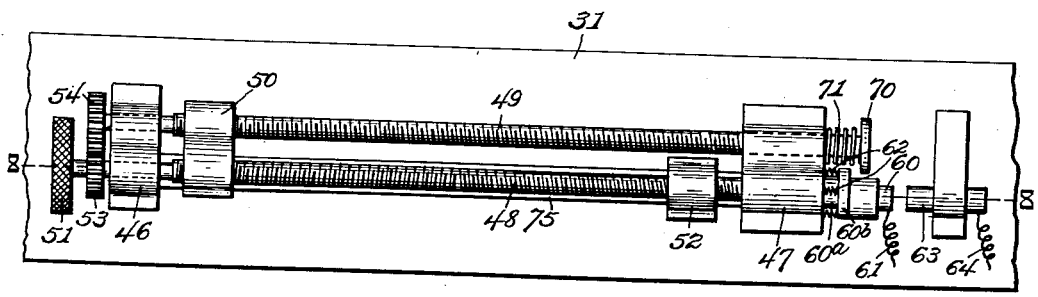
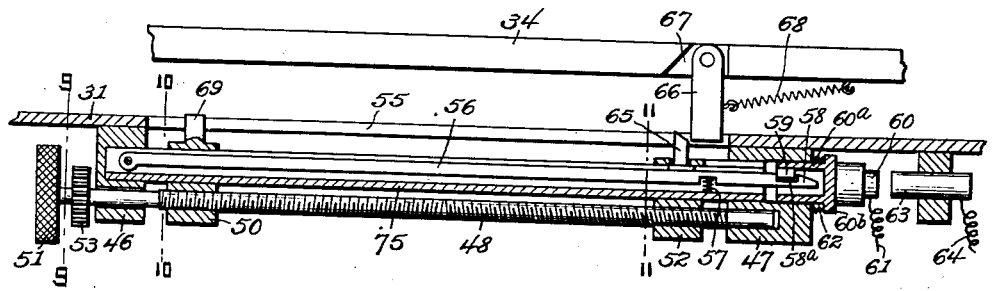
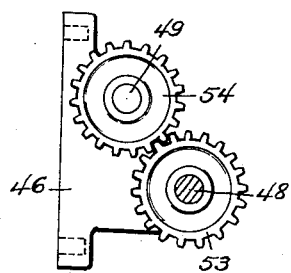
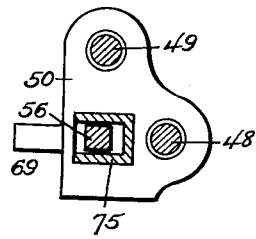
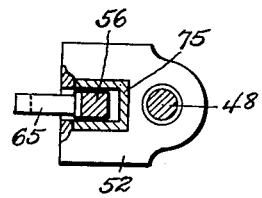
WITNESSES:
F. E. Arthur
W. F. Kiefer
INVENTOR
W. E. Andrews
BY
H. E. Dunlap
ATTORNEY

UNITED STATES PATENT OFFICE.

WILLIAM E. ANDREWS, OF BELLAIRE, OHIO, ASSIGNOR OF ONE-HALF TO W. A. STELLERS, OF BELLAIRE, OHIO.

ELECTRIC WELDING-MACHINE.

1,115,461.  Specification of Letters Patent.  Patented Oct. 27, 1914.

Application filed July 6, 1914. Serial No. 849,026.

*To all whom it may concern:*

Be it known that I, WILLIAM E. ANDREWS, a citizen of the United States of America, and resident of Bellaire, county of Belmont, and State of Ohio, have invented certain new and useful Improvements in Electric Welding-Machines, of which the following is a specification.

This invention relates broadly to electric welding apparatus, and specifically to a machine for welding the seams of tubular sheet metal articles.

The primary object of the invention is to provide a machine for electrically welding the meeting or overlapped edges of tubular articles, such, for instance, as coffee pots and other culinary vessels which are to have an enamel coating applied thereto, which machine is adapted to so firmly and closely weld said edges that the seam is rendered practically imperceptible, especially after the article has been enameled.

A further object is to provide an apparatus of the character mentioned embodying means whereby the electric circuit supplying the current employed in performing the welding operation is automatically closed and broken at the proper times, and wherein is provided adjusting means for regulating the period during which the said circuit remains closed.

With these and other objects in view, the invention resides in the features of construction, arrangement of parts and combinations of elements which will hereinafter be fully explained, reference being had to the accompanying drawings, forming a part of this specification, in which—

Figure 1:
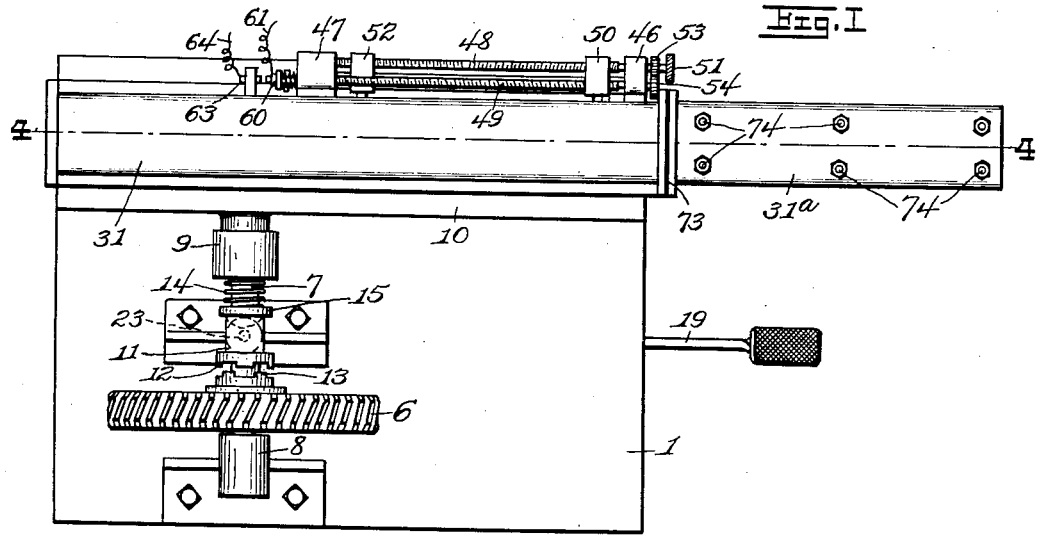
Figure 2:
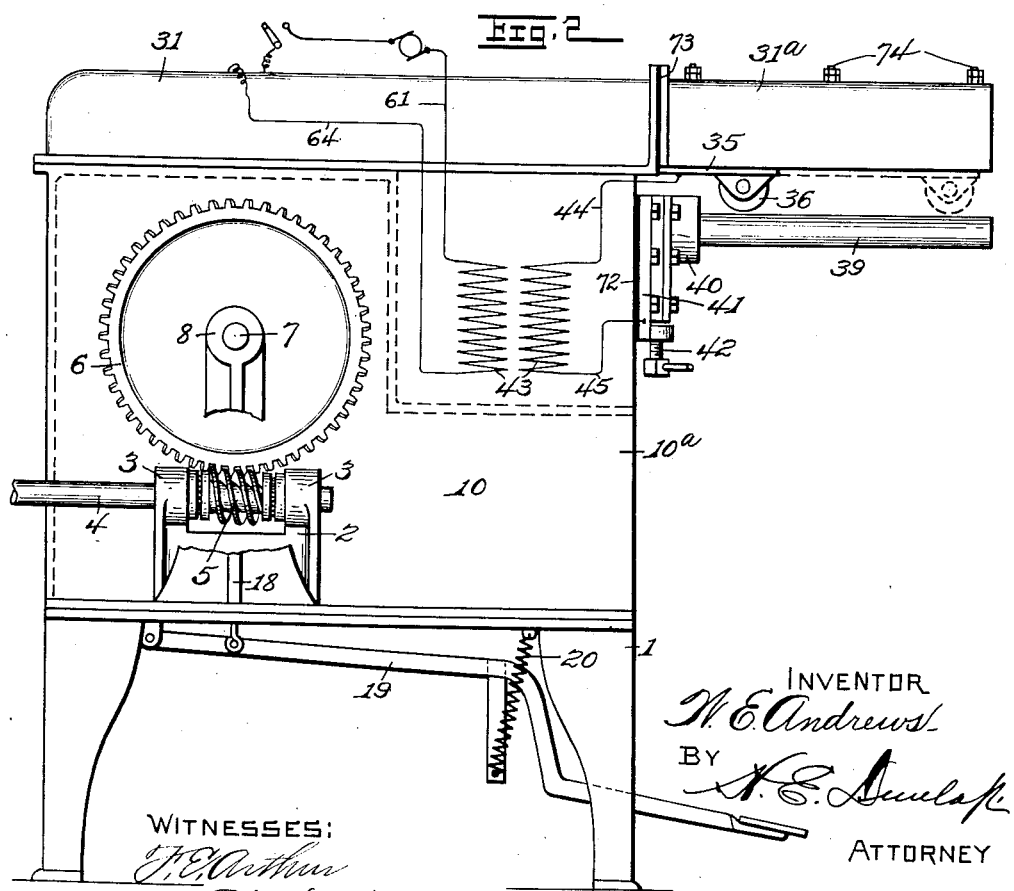

Figure 1 is a top plan view of the invention; Fig. 2 is a side elevation of the same, parts being shown broken away; Fig. 3 is a front end elevation of the same; Fig. 4 is a longitudinal section on the line 4—4, Fig. 1; Fig. 5 is a transverse section on the line 5—5, Fig. 4; Fig. 6 is a similar section on the line 6—6, Fig. 4; Fig. 7 is an enlarged side elevation of the automatic circuit closing and breaking mechanism; Fig. 8 is a horizontal section taken on the line 8—8, Fig. 7; and Figs. 9, 10 and 11 are enlarged detail sections taken, respectively, on the lines 9—9, 10—10 and 11—11, Fig. 8.

Referring to said drawings, in which like designating characters distinguish like parts throughout the several views—1 indicates generally a suitable supporting frame or table upon which, at one side, is mounted a pedestal 2 carrying bearings 3 in which is journaled one end of a drive-shaft 4. Said drive-shaft has fixed thereon between said bearings 3 a worm gear 5 with which meshes a gear 6 loosely mounted on a shaft 7 journaled in suitable bearings 8 and 9, the latter provided in an upright member 10ª of a frame which is generally designated by the numeral 10. A sleeve 11 splined on said shaft 7 has its outer end formed to constitute a clutch element, having outwardly directed teeth 12 which are adapted in one position of said element to interlock with teeth 13 of a complemental clutch element formed on the hub of said gear 6, thus causing rotation to be communicated from said gear to said shaft. A coil spring 14 interposed between the outer end of the bearing 9 and the adjacent end of said sleeve 11 serves to normally hold the latter in an outwardly thrust position wherein the clutch elements are interlocked. The inner end of said sleeve has formed thereon an annular rib 15 the outer face of which is irregular and constitutes a cam against which rests the upper end of a normally elevated plunger 16. Said plunger is movably mounted in a vertical position within the tubular portion 17ª of a supporting bracket 17, being fixed upon the upper end of a vertically movable rod 18 whose lower end is pivotally connected to a pedal operated lever 19. A suitably located retractile spring 20 normally holds said lever in an elevated position, and a spring 21 interposed between the lower end of said plunger and the lower end of the bore in said tubular portion 17ª of bracket 17 serves to normally maintain said plunger elevated.

As will be obvious, when the pedal lever is depressed, the plunger 16 is withdrawn from engagement with the cam face of the rib 15 carried by the sleeve 11, whereupon, actuated by spring 14, said sleeve is immediately shifted into a position wherein the clutch elements interengage and the shaft 7 begins to rotate. Said cam face is of such form that a complete revolution of the shaft 7 is permitted before the clutch elements are again separated by the action of the plunger, which latter is released by the removal of the foot pressure on the lever 19 promptly after said shaft begins to rotate. A short stud 22 is preferably provided on the upper end of the plunger for seating in a correspondingly shaped socket 23 provided in the sleeve 11 when the limit of the inward movement of the latter has been reached, thus securely locking said sleeve against rotation until such time as said plunger is withdrawn by foot pressure applied to the pedal.

Fixed on the end of shaft 7 between the members or sides of the frame 10 is a bracket 24 of substantially U-shape, in the opposite parallel members of which are journaled the ends of a threaded rod or screw 25. Mounted on said threaded rod or screw so as to be rendered adjustable thereon by rotation thereof is a block 26 having fixed therein a wrist-pin 27 which projects through and operates in a slot 28 provided in a rocker-arm 29 intermediate the ends of the latter. Said rocker-arm is pivotally mounted at its lower end, as upon a portion of the frame 10, as shown in Figs. 3, 4 and 5, and has an upper bifurcated end the members of which are disposed in straddling relation to a block 30 which is slidable horizontally within the embrace of a suitable casing-like guide 31 mounted upon the top of the frame 10. Open longitudinal slots 32 provided in the members constituting the upper end of the rocker-arm have received therein the opposite ends of a transversely directed pin 33 carried by the block 30, means being thus provided whereby rocking movement of said arm imparts reciprocating movement to said block.

As is obvious, by adjustment of the block 26 on the screw 25, the distance of the wrist-pin 27 from the axis of shaft 7 is regulated, thus providing for adjustment of the throw of the rocker arm and, consequently, the length of the reciprocating movement of the block 30.

Having one end pivotally connected to the slide-block 30 is a horizontally disposed rod 34 the opposite end of which is connected to a head-block 35 composed of copper or other material highly conductive of electricity, having a copper welding wheel, or wheel electrode, 36 journaled therein. Said head-block is slidably mounted within the embrace of a horizontally disposed guide-member 37 which is vertically movable within a forward extension 31ª of the guide 31. Vertical pins 74 mounted in the top of said extension 31ª carry coil springs 38 which exert downwardly directed pressure on said guide member 37 for yieldingly depressing the latter.

The electrode 36 is supported with the lower portion of its periphery contiguous to a horizontally disposed copper electrode 39 of mandrel or horn shape which has one end rigidly supported by a block 40 mounted in a bracket 41 carried by the frame 10. Said block 40 is vertically adjustable on said bracket for adjusting said horn electrode with respect to said wheel electrode 36, an adjusting screw 42 being suitably mounted for raising and lowering said block, as is clearly shown in Figs. 3 and 4.

An electric transformer, indicated diagrammatically at 43 in Figs. 2 and 4, has its low potential terminals or conductors 44 and 45 connected, respectively, to the head-block 35 and to the bracket 41, the current from said head-block passing directly to the wheel electrode 36, and the current from the bracket passing to the block 40 and thence to the horn electrode 39.

In practice, the tubular article which is to be welded is slipped over the horn electrode 39 and the edges to be welded are properly overlapped, the inner end of the seam being placed directly underneath the wheel electrode 36. When the pedal lever 19 is depressed, causing the rocker-arm 29, through the intermediate mechanism, to swing forward, the wheel electrode is thereby actuated to rotate forward and to exert a yielding pressure on the seam interposed between it and the horn electrode to produce a proper weld, a welding heat being induced by the electric current which passes between the wheel electrode and the horn electrode through the interposed metal. At the instant that the wheel electrode is actuated to move forward, as aforesaid, the electric circuit which furnishes the heating current is automatically closed. The mechanism by which this is accomplished will now be explained.

Mounted upon one side of the casing-like guide 31 are suitable bearing brackets 46 and 47 which have slidably mounted therein the opposite neck portions of each of two threaded shafts 48 and 49. The shaft 48 is threaded outward in opposite directions from a point substantially midway between its ends, as shown in Figs. 1, 7 and 8, and has mounted on one of its threaded portions a block 50 which is adjustable forward and rearward by rotary motion applied to said shaft by means of a hand wheel 51. On the other threaded portion of said shaft and adjustable simultaneously with the block 50 is a block 52. The purposes of said blocks 50 and 52 will hereinafter be made apparent. A gear wheel 53 carried by said shaft 48 meshes with a similar wheel 54 carried by the shaft 49, said gear wheels serving to impart to the last mentioned shaft rotary movement in a direction reverse to that given the shaft 48. Said shaft 49 is threaded in a direction reverse to that of that portion of the shaft 48 on which the block 50 is located and is also received by said block, as is most clearly shown in Fig. 10; consequently, rotation of said shafts carries said block 50 forward or backward, according to the direction of rotation, and a forward or rearward longitudinal sliding movement of one shaft produces, through said block 50, a corresponding movement of the other shaft. Having its opposite ends rigidly mounted in the bearing brackets 46 and 47, and having its body extending through said blocks 50 and 52 in such a way that the latter are slidable thereover, is a member 75, substantially U-shaped in cross section, the open side of which faces inward and lies directly opposite to a longitudinal slot 55 provided in the adjacent side of said casing-like guide 31. Pivotally mounted within the front end of said member 75— that is, at the end which is mounted in the bracket 46—is one end of a trigger 56 the opposite or free end of which is yieldingly maintained in an outwardly or laterally pressed position by means of a suitable spring, as 57. The said free end of said trigger, projected on beyond the corresponding end of the member 75, is of beveled hook or keeper form, as is clearly shown at 58 in Fig. 8, and normally has received in the keeper notch 58$^a$ thereof a lug 59 carried on the interior wall of the tubular portion 60$^a$ of a longitudinally movable contact member 60 to which leads a conductor 61 from the high potential side of the transformer. Said contact member has its said tubular portion movably mounted in the bearing bracket 47 and has interposed between the outer edge of said bracket and an annular rib or flange 60$^b$ formed thereon one or more coil springs 62 whereby, when it is released by said trigger, it is thrust outward into contact with a suitably mounted contact member 63 to which leads the opposite terminal or conductor 64 of the high potential side of the transformer, thus completing the transformer circuit and producing a welding heat through the metal of the seam interposed between the wheel electrode and the horn electrode.

The trigger 56 has seated against that side thereof which faces the slot 55 the base of a laterally extending dog 65 having a forwardly directed bevel at its end adapted to be engaged and depressed by a pivoted arm 66 carried by the rod 34 at the instant that the latter, actuated by the rocker-arm 29, begins its forward stroke. Said dog 65 is projected outward through the side of the adjustable block 52 and is movable with the latter, its base being slidably seated against said trigger. The arm 66 is pivotally mounted in a recess 67 provided on the upper surface of the rod 34 and is normally held by a spring 68 in a position substantially at right angles to said rod. Thus, when said rod begins its forward movement, its free end engages the bevel of the dog 65 and causes the latter to be forced inward, resulting in the trigger 56 being forced inward against the tension of spring 57. This movement effects the disengagement of the hook 58 from the lug 59, permitting the contact member 60, actuated by springs 62, to move into contact with contact member 63. Upon the return stroke of the rod 34, the arm 66 engages the dog 65 and is thereby swung forward against the tension of spring 68 until it passes over said dog, when said arm resumes its normal position. Near the end of the forward movement or stroke of the rod 34, a laterally projecting stud 69 carried by the adjustable block 50 is engaged by the arm 66, and, with the further movement of said rod, the said block 50 and the shafts 48 and 49 on which said block is mounted are together carried forward, said shafts having longitudinal sliding movement with respect to the bearing brackets 46 and 47.

On the rear projecting end of the shaft 49 is a fixed head, or projecting peripheral flange, 70 between which and the adjacent face of the bracket 47 a strong spiral spring 71 is interposed, said spring serving to normally maintain said shaft 49 in a rearwardly thrust position. When the contact member 60 lies in contact with contact member 63, as hereinbefore described, the outer face of the rib or flange 60$^b$ engages the inner face of the flange 70. Consequently, when the shafts 48 and 49 are carried forward, as hereinbefore described, the contact member 60 is retracted therewith against the tension of springs 62 to a point where the lug 59 is received in the keeper notch 58$^a$ of the hook 58 formed on the pivoted trigger 56, thus breaking the electric circuit through the transformer. The spring 71 acts to return the shafts 48 and 49 to their normal positions when the rod 34 starts back on its return stroke.

As is obvious, the blocks 50 and 52 are adjusted so that they are separated a distance substantially equal to the length of the seam to be welded. This results in the welding circuit being closed at the beginning and broken at the end of the forward movement of the wheel electrode.

As is obvious, suitable insulation must be provided at various points throughout the machine, as between the bracket 41 and the frame 10, as shown at 72, and between the guide 31 and its extension 31$^a$, as shown at 73; however, since the parts to be insulated will be readily located by anyone skilled in the art, the insulation has not been shown at all points where its use is required.

From the foregoing it will be noted that, when the rocker-arm 29 begins its forward stroke, actuating the rod 34 to move forward, the pivoted arm 66 immediately engages the beveled end of the dog 65 seated against trigger 56 and forces the latter inward as it passes over said end, thus releasing the spring-pressed contact member 60 which immediately assumes a position in contact with the stationary contact member 63, closing the transformer circuit which includes the horn electrode 39 and then moving wheel electrode 36. Just prior to reaching the end of the forward stroke or movement of the rod 34, the pivoted arm 66 carried thereby engages the stud 69 of the adjustable block 50, and, throughout the remainder of said stroke, actuates said block to travel forward, carrying therewith the shafts 48 and 49. Since the flange 60$^b$ of contact member 60 then rests against the opposing fixed flange or head 70 of said rod 49, the said forward movement of the latter effects the withdrawal of said contact member 60 from contact with contact-member 63, thus breaking said transformer circuit.

What is claimed is—

1. An electric welding machine comprising a horn electrode, a wheel electrode mounted to travel along said horn electrode, a transformer having terminals connected to said electrodes, means for producing reciprocating movement of said wheel electrode, and means actuated by said movement producing means for closing and opening the transformer circuit at predetermined points in the travel of said wheel electrode.

2. An electric welding machine comprising a horn electrode, a wheel electrode mounted to travel along said horn electrode, a transformer having terminals connected to said electrodes, rocking means for advancing and retracting said wheel electrode, and means actuated by the first-mentioned means for opening and closing the transformer circuit at predetermined points in the advance movement of said wheel electrode.

3. An electric welding machine comprising a stationary horn electrode, a wheel electrode, means yieldingly supporting said wheel electrode over said horn electrode, a transformer having terminals connected to said electrodes, means for advancing and retracting said wheel supporting means, and automatically actuated means for opening and closing the transformer circuit at predetermined points in the travel of said wheel electrode.

4. An electric welding machine comprising a stationary horn electrode, a wheel electrode, means yieldingly supporting said wheel electrode over said horn electrode, a transformer having terminals connected to said electrodes, means for advancing and retracting said wheel supporting means, and means actuated by said advancing and retracting means for opening and closing the transformer circuit at predetermined points in the travel of the wheel electrode.

5. An electric welding machine comprising a horn electrode, a wheel electrode mounted to travel along said horn electrode, a transformer having terminals connected to said electrodes, a pivoted rocker-arm, means for rocking said arm back and forth, means interposed between said arm and said wheel electrode whereby reciprocating movement is imparted to the latter, and means actuated by the last mentioned means whereby the transformer circuit is closed and opened at predetermined points in the travel of said wheel electrode.

6. An electric welding machine comprising a horn electrode, a wheel electrode mounted to travel along said horn electrode, a transformer having terminals connected to said electrodes, a pivoted rocker-arm, means for rocking said arm back and forth, means for adjusting the throw of said arm, means interposed between said arm and said wheel electrode whereby the rocking movement of the former effects reciprocating movement of the latter, and automatically actuated means closing and opening the transformer circuit at predetermined points in the travel of the wheel electrode.

7. An electric welding machine comprising a horn electrode, a wheel electrode mounted to travel along said horn electrode, a transformer having terminals connected to said electrodes, a pivoted rocker-arm, means for rocking said arm back and forth, means for adjusting the throw of said arm, means interposed between said arm and said wheel electrode whereby the rocking movement of the former effects reciprocating movement of the latter, a spring-pressed movable contact in the transformer circuit, means normally maintaining said contact retracted in a position holding said circuit open, means for releasing said contact to close said circuit at a predetermined point in the travel of said wheel electrode, and means for returning said contact to retracted position at a predetermined point in said travel.

8. An electric welding machine comprising a horn electrode, a wheel electrode mounted to travel along said horn electrode, a transformer having terminals connected to said electrodes, a pivoted rocker-arm, means for rocking said arm back and forth, means for adjusting the throw of said arm, means interposed between said arm and said wheel electrode whereby the rocking movement of the former effects reciprocating movement of the latter, a spring-pressed movable contact in the transformer circuit, means normally maintaining said contact retracted in a position holding said circuit open, means for releasing said contact to close said circuit at a predetermined point in the travel of said wheel electrode, means for returning said contact to retracted position at a predetermined point in said travel, and means for adjusting the length of traverse of said wheel electrode between the circuit closing and opening positions thereof.

9. An electric welding machine comprising a horn electrode, a wheel electrode mounted to travel along said horn electrode, a transformer having terminals connected to said electrodes, a pivoted rocker-arm, means for producing a forward and return stroke of said arm, means whereby said movement is automatically stopped at the end of the return stroke, means interposed between said arm and said wheel electrode whereby a complete reciprocation of the latter is effected by said forward and return stroke, and means whereby the transformer circuit is closed and opened at predetermined points in said reciprocation.

10. An electric welding machine comprising a horn electrode, a wheel electrode mounted to travel along said horn electrode, a transformer having terminals connected to said electrodes, a pivoted rocker-arm, means for producing a forward and return stroke of said arm, means whereby said movement is automatically stopped at the end of the return stroke, means interposed between said arm and said wheel electrode whereby a complete reciprocation of the latter is effected by said forward and return stroke, and means whereby the transformer circuit is closed and opened at predetermined points in the forward stroke.

11. An electric welding machine comprising a horn electrode, a wheel electrode mounted to travel along said horn electrode, a transformer having terminals connected to said electrodes, a pivoted rocker-arm, a constantly rotating element, a normally stationary rotary shaft on which said element is mounted, means interposed between said shaft and said rocker-arm whereby rotation of the former oscillates the latter, a clutch interposed between said shaft and said element, means normally maintaining said clutch disengaged from said element, means for withdrawing the last mentioned means, means actuating the released clutch to engage said element to operatively connect said shaft and said element, automatic means for disengaging said clutch from said element when said shaft has made a complete revolution, means interposed between said arm and said wheel electrode whereby oscillation of the former reciprocates the latter, and means whereby the transformer circuit is closed and opened at predetermined points in the travel of said wheel electrode.

In testimony whereof, I affix my signature in presence of two subscribing witnesses.

WILLIAM E. ANDREWS.

Witnesses:
H. E. DUNLAP,
ROBT. ELSON.